US012344214B2

(12) United States Patent
Loch et al.

(10) Patent No.: US 12,344,214 B2
(45) Date of Patent: Jul. 1, 2025

(54) SENSOR ASSEMBLY, DRYER, AND VEHICLE CONTROL SYSTEM USING THE SAME

(71) Applicant: Transportation IP Holdings, LLC, Norwalk, CT (US)

(72) Inventors: Mark Elliott Loch, Fairview, PA (US); James Morrow, Salem, VA (US); Niteen Patel, Salem, VA (US); Leonard Wedge, Salem, VA (US); Donald L Hughes, Roanoke, VA (US); J. Hunter Babcock, Salem, VA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 853 days.

(21) Appl. No.: 17/507,623

(22) Filed: Oct. 21, 2021

(65) Prior Publication Data

US 2022/0266810 A1 Aug. 25, 2022

Related U.S. Application Data

(60) Provisional application No. 63/151,385, filed on Feb. 19, 2021.

(51) Int. Cl.
*B60T 17/22* (2006.01)
*B60T 17/00* (2006.01)

(52) U.S. Cl.
CPC .......... *B60T 17/221* (2013.01); *B60T 17/004* (2013.01); *B60Y 2400/30* (2013.01); *B60Y 2400/81* (2013.01)

(58) Field of Classification Search
CPC ...... F26B 25/00; B60T 17/221; B60T 17/004; B60Y 2400/30; B60Y 2400/81
(Continued)

(56) References Cited

U.S. PATENT DOCUMENTS 4,487,617 A * 12/1984 Dienes .................. B60T 17/004
96/136
5,103,576 A * 4/1992 Cramer ................ B01D 53/261
34/80
(Continued)

FOREIGN PATENT DOCUMENTS

CN  109316906 A  *  2/2019  ............. B01D 46/46
DE  102017008611 A1 *  3/2018  ......... B01D 53/0454
(Continued)

OTHER PUBLICATIONS

Wabtec Graham White "Air Dryers", https://www.grahamwhite.com/products/air-dryers (4 pages).
(Continued)

*Primary Examiner* — Stephen M Gravini
(74) *Attorney, Agent, or Firm* — K&L Gates LLP

(57) ABSTRACT

A sensor assembly includes a fastener body extending from a fastener end to an opposite sensor end along an elongation direction. The sensor end is shaped to be inserted into a sensor port of an air dryer. A sensor substrate includes one or more conductive bodies protruding from the sensor substrate and one or more first conductive pathways coupled with the one or more conductive bodies. The sensor assembly also includes a sensor coupled with the sensor substrate and conductively coupled with the one or more conductive bodies by the one or more first conductive pathways. The sensor is configured to sense a humidity of air flowing through the air dryer. The one or more conductive bodies of the sensor substrate are positioned to engage one or more arcuate or annular conductive pathways in the air dryer in different rotational positions of the fastener body relative to the air dryer.

18 Claims, 7 Drawing Sheets

(58) Field of Classification Search
USPC .......................................................... 34/524
See application file for complete search history.

(56) References Cited

U.S. PATENT DOCUMENTS

| | | | | |
|---|---|---|---|---|
| 5,522,150 | A * | 6/1996 | Schultz | B60T 17/004 34/80 |
| 5,592,754 | A * | 1/1997 | Krieder | F04B 49/022 34/80 |
| 5,715,621 | A * | 2/1998 | Mitsch | B60T 17/004 34/80 |
| 5,901,464 | A * | 5/1999 | Kazakis | B60T 17/004 34/562 |
| 6,014,820 | A * | 1/2000 | Jones | B01D 53/261 34/80 |
| 6,077,330 | A | 6/2000 | Sabelstrom | |
| 7,121,016 | B2 * | 10/2006 | Burn | B60T 17/004 95/96 |
| 9,050,957 | B2 * | 6/2015 | Minato | B60T 13/662 |
| 9,199,524 | B2 | 12/2015 | Stabenow | |
| 9,751,505 | B1 | 9/2017 | Pedersen | |
| 10,080,990 | B2 | 9/2018 | Miehe et al. | |
| 10,279,792 | B2 | 5/2019 | Mauder | |
| 10,493,970 | B2 | 12/2019 | Merkel et al. | |
| 10,603,627 | B2 * | 3/2020 | Bergh | F24F 3/1429 |
| 10,723,341 | B2 * | 7/2020 | Reifinger | B01D 53/261 |
| 12,053,739 | B2 * | 8/2024 | Bergh | B01D 53/261 |
| 2019/0301957 | A1 | 10/2019 | Spanevello | |
| 2020/0132564 | A1 | 4/2020 | Hatzfeld | |
| 2022/0266810 | A1 * | 8/2022 | Loch | B60T 17/004 |

FOREIGN PATENT DOCUMENTS

| | | | | |
|---|---|---|---|---|
| EA | 201800509 | A2 | 2/2019 | |
| EP | 1577648 | A1 | 9/2005 | |
| WO | WO-02053995 | A1 * | 7/2002 | ............... A24B 1/02 |
| WO | WO-2021053524 | A1 * | 3/2021 | ......... B60H 1/00371 |

OTHER PUBLICATIONS

Office Action for corresponding Eurasian patent application No. 202290335 mailed Nov. 3, 2022 (4 pages).
Search Report for corresponding Eurasian patent application No. 202290335 mailed Jul. 7, 2022 (5 pages).
Examination Report mailed Dec. 9, 2022 for corresponding Australian Application No. 2022200979 (5 pages).
Extended European Search Report for corresponding European Patent Application No. 22 155 762.2 ( pages).

* cited by examiner

SENSOR ASSEMBLY, DRYER, AND VEHICLE CONTROL SYSTEM USING THE SAME

CROSS-REFERENCE TO RELATED APPLICATIONS

This application claims priority to U.S. Provisional Application No. 63/151,385 (filed 19 Feb. 2021), the entire disclosure of which is incorporated herein by reference.

BACKGROUND

Technical Field

The subject matter described herein relates to humidity sensor assemblies, air dryers, and vehicle systems using the same.

Discussion of Art

Some vehicle systems include air dryers that remove moisture from air to reduce the humidity in the air. For example, vehicles having air brake systems may include air dryers that remove moisture from air in the brake systems to reduce deterioration of components of the brake system.

While some known air dryers include humidity sensors that detect abnormally high humidity in air, these known air dryers may just generate a warning (e.g., by activating a light or horn) to notify operators of the high humidity. The high humidity information (or other potentially useful information) from the air dryer is not used to control operation (e.g., movement) of the vehicle system.

Additionally, the humidity sensors in some known air dryers can be difficult to replace. The sensors may be disposed in locations that are difficult to reach or that otherwise require significant effort to replace when the sensors need replacement. It may be desirable to have dryer systems that differ from those that are currently available.

BRIEF DESCRIPTION

In one embodiment, a sensor assembly includes a fastener body extending from a fastener end to an opposite sensor end along an elongation direction, the sensor end shaped to be inserted into a sensor port of an air dryer, and a sensor substrate coupled with the sensor end of the fastener body. The sensor substrate includes one or more conductive bodies protruding from the sensor substrate and one or more first conductive pathways coupled with the one or more conductive bodies. The sensor assembly also includes a sensor coupled with the sensor substrate and conductively coupled with the one or more conductive bodies by the one or more first conductive pathways. The sensor may sense a humidity of air flowing through the air dryer. The one or more conductive bodies of the sensor substrate are positioned to engage one or more arcuate or annular conductive pathways in the air dryer in different rotational positions of the fastener body relative to the air dryer.

In one embodiment, a dryer includes a container that may receive air from a compressed air system of a vehicle system and to reduce a humidity of the air, one or more sensors may sense a characteristic of one or more of the air from the compressed air system, operation of the air dryer, or operation of the vehicle system, and a communication device communicatively coupled with the one or more sensors. The communication device may communicate the characteristic to a vehicle control system.

In one embodiment, a vehicle control system includes one or more processors may receive a characteristic of one or more of air from a vehicle compressed air system that flows through an air dryer that reduces a humidity of the air, operation of the air dryer, or operation of a vehicle system. The one or more processors may receive the characteristic from the air dryer and to control operation of one or more of the air dryer or the vehicle system based at least in part on the characteristic that is received from the air dryer.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
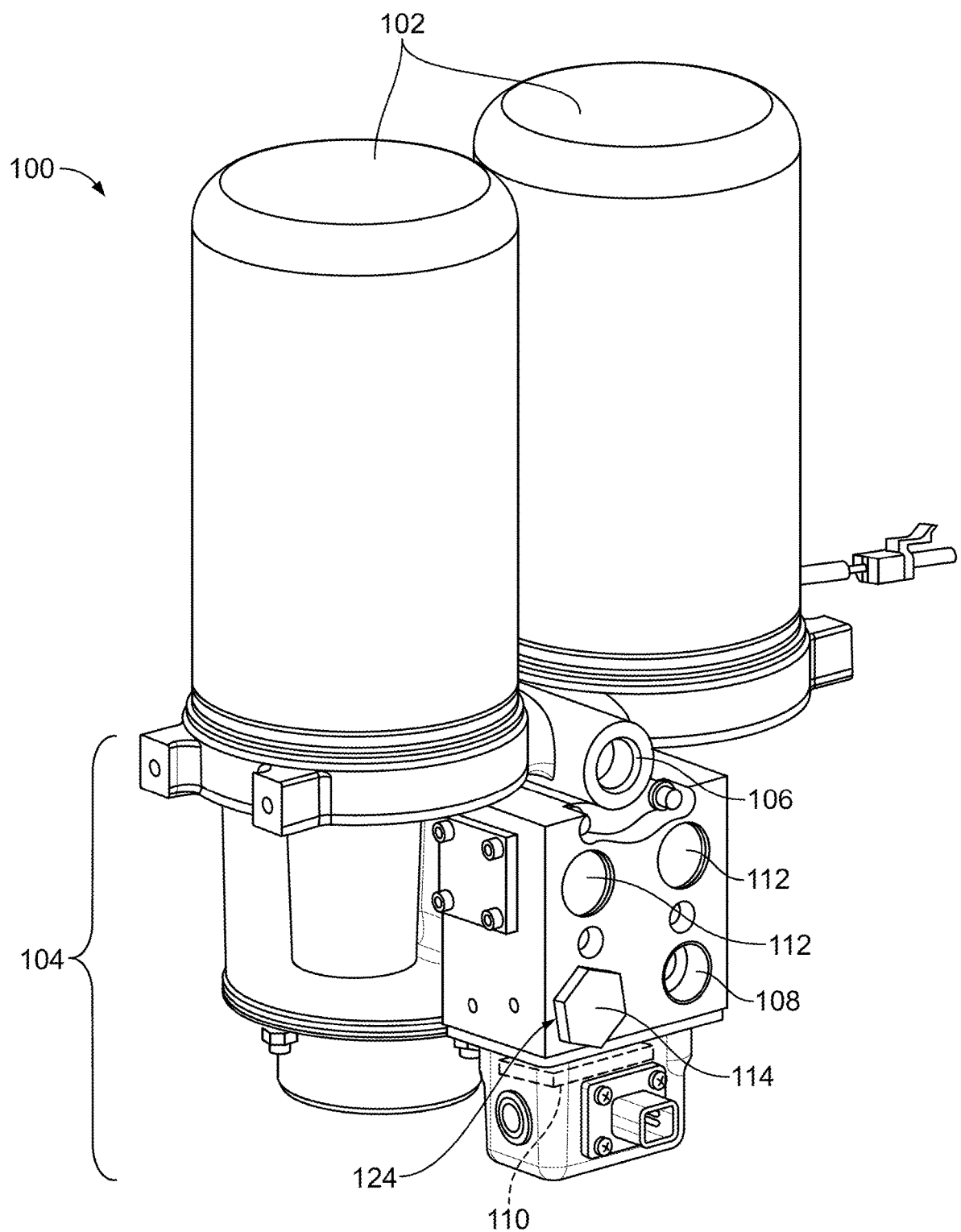
FIG. 1 illustrates an air dryer according to an embodiment of the inventive subject matter.

The subject matter described herein relates to a sensor assembly and a dryer using the sensor assembly. In one embodiment, the dryer is an air dryer for a vehicle system. FIG. 1 illustrates an air dryer 100 according to an embodiment of the inventive subject matter. In this embodiment, the air dryer includes two towers 102 each containing desiccant media. The air dryer can be referred to as a twin tower desiccant air dryer. The air dryer removes water vapor from the compressed air system in a vehicle. Suitable vehicles may be a train, a truck, a bus, and an automobile. Or, it may be an air system disposed onboard another type of vehicle (e.g., an agricultural vehicle, mining vehicle, or the like).

Each of the towers is a container (e.g., canister) that couples with a body 104 of the air dryer. The illustrated air dryer includes two towers. Other embodiments may include a single tower, or more than two towers. The canisters and body can include threaded connections such that the towers can be screwed into the body. An inlet 106 is fluidly coupled with the vehicle compressed air system so that the air dryer body receives the air from the compressed air system via the inlet. The incoming air is directed into one of the towers by internal conduits within the body. Each of the towers includes desiccant material that adsorbs moisture (e.g., water vapor) in the incoming air. The air is thereby at least partially dried by removing at least some of the water vapor from the incoming air. The at least partially dried air is then directed out of the air dryer via a primary outlet 108. This outlet also can be fluidly coupled with the vehicle compressed air system so that the at least partially dried air is directed back into the compressed air system. The air may be partially dried when the outgoing air that exits the air dryer via the outlet is drier than the incoming air received via the inlet, but that still includes at least some moisture. For example, the air may be partially dried when the outgoing air has lower humidity than the incoming air, but still has some measurable humidity.

Suitable desiccant media may include one or more of silica, activated charcoal, calcium sulfate, calcium chloride, and molecular sieves. Suitable molecular sieves may include zeolites. Other materials, such as biocides, biostats, pH buffer, and the like may be added to the desiccant media based on end use parameters. In one embodiment, rather than simply drying the air, the humidity level is controlled to be a determine range, and in such an embodiment (and based on use application) a humectant may be used as media in place of or in conjunction with the desiccant, with the controller determining the air flow path via one or the other.

The term saturated, as used herein, means that a water content of the desiccant media is at or above a determined threshold level. This threshold level may differ by media type, by use case, by user preference, and the like. When the desiccant material in one tower becomes saturated, a controller 110 inside the body of the air dryer can switch flow of the incoming air received via the inlet from one tower to the other tower. For example, the controller can activate or change a state of a valve that directs the incoming air from the inlet to be directed from one tower to the other tower. The moist air in the saturated tower can be purged out of the saturated tower via a corresponding purge outlet 112. In the illustrated embodiment, each tower purges the moist air out of the tower when the tower is saturated via a different purge outlet. Alternatively, multiple towers can purge the air out of the same purge outlet. The purged air is directed out of the air dryer but is not directed back into the compressed air system. Instead, the purged air can be directed elsewhere, such as into the ambient environment. The controller can continue switching back-and-forth between which tower receives the incoming air and which tower is purging air. The air dryer includes a heater 136 that receives electric power to generate heat to prevent the valves from freezing. Optionally, a heater can generate heat to increase the temperature of desiccant inside a tower during purging of air from that same tower.

The controller can represent hardware circuitry that includes and/or is connected with one or more processors (e.g., one or more microprocessors, field programmable gate arrays, integrated circuits, or the like). The controller can be communicatively coupled with one or more sensor assemblies 114 by one or more conductive pathways (e.g., wires, cables, traces, or the like) and/or wireless pathways. These sensor assemblies can sense one or more characteristics of the outgoing air, the air within either of the towers, and/or the incoming air. The characteristics can include humidity of the air, temperature of the air, pressure of the air, flow rate of the air, or the like. The sensor assemblies can communicate the characteristics (or signals indicative of the characteristics) to the controller. As described herein, the controller can use the characteristics to control operation of the air dryer and/or can communicate the characteristics to a vehicle control system. The vehicle control system can use this information to control operation (e.g., movement) of a vehicle system, also as described herein.

Figure 2:
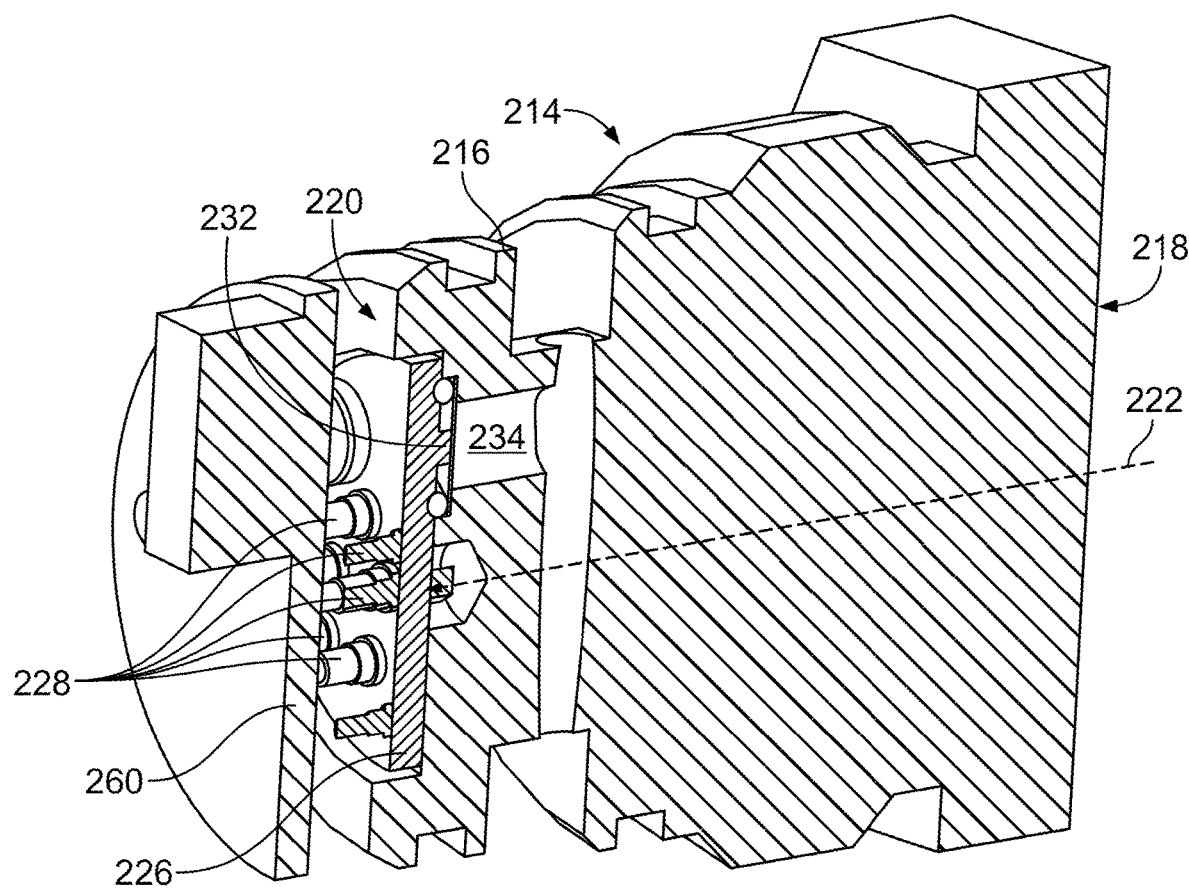
FIG. 2 illustrates a first cross-sectional view of one example of a sensor assembly.
Figure 3:
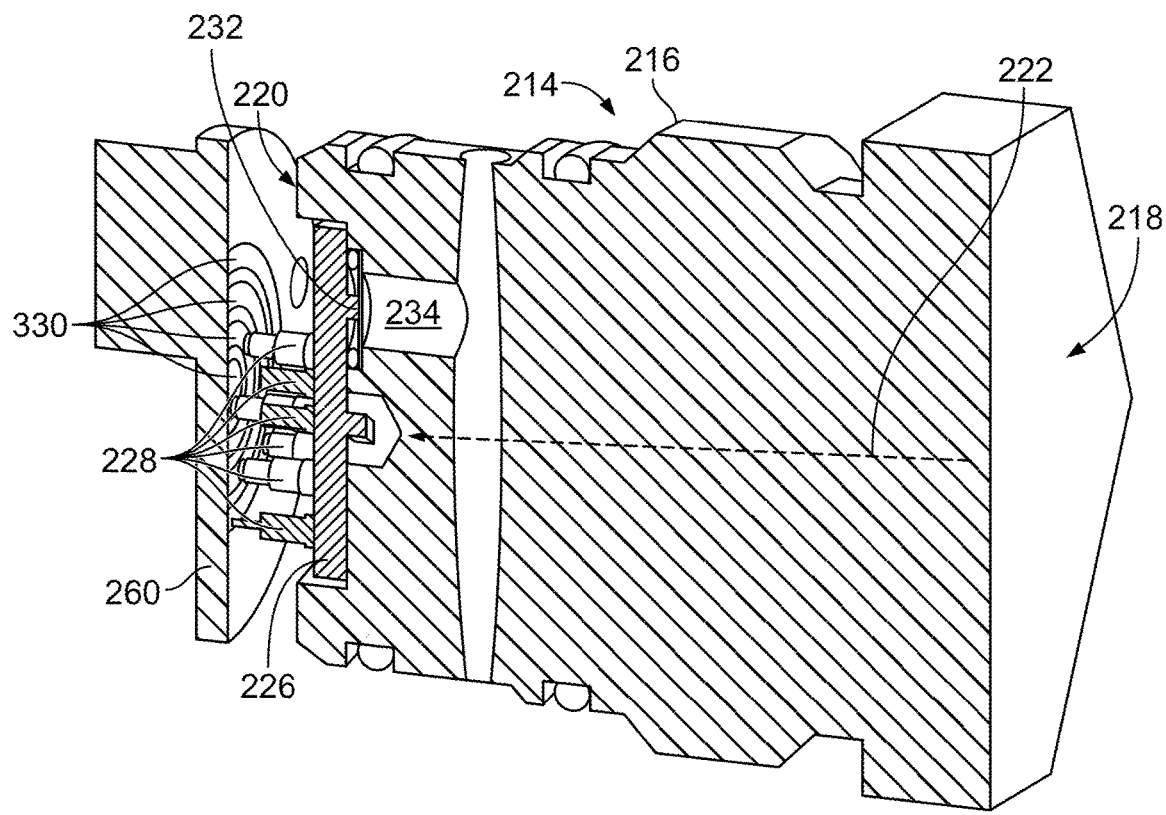
FIG. 3 illustrates a second cross-sectional view of the sensor assembly shown in FIG. 2.

FIG. 2 illustrates a first cross-sectional view of one example of a sensor assembly 214 and FIG. 3 illustrates a second cross-sectional view of the sensor assembly shown in FIG. 2. This sensor assembly can represent the sensor assembly 114 shown in FIG. 1. In one embodiment, the sensor assembly senses humidity in the outgoing air that exits the air dryer from the tower that is not purging. Alternatively, the sensor assembly can sense another characteristic of this air, such as the temperature, pressure, flow rate, or the like.

The sensor assembly includes a fastener body 216. The fastener body may extend from a fastener end 218 to an opposite sensor end 220 along an elongation direction 222. In the illustrated embodiment, the fastener end has a shape that matches a tool that can be used to secure the fastener body to the body of the air dryer. For example, the fastener end may have a hexagonal shape so that a wrench or socket wrench can be used to screw the fastener body into (or out of) the sensor port. Alternatively, the fastener end may have a recess shaped to receive a tool (e.g., a hexagonal recess shaped to receive an end of a hex key, a recess shaped to receive a screwdriver head, etc.), a flat surface (e.g., a wrench flat) for allowing a tool to rotate the fastener body, a spanner hole that can be engaged by a spanner wrench, etc., for securing the fastener body to the air dryer body.

The body of the air dryer includes a sensor port 124 (shown in FIG. 1) that is shaped to mate with the sensor end of the sensor assembly. For example, the sensor end of the sensor assembly can be inserted into the sensor port of the air dryer. The sensor port and/or sensor end can include mating features that mate and/or secure the sensor assembly with the air dryer, such as matching threads, a friction fit connection, or the like. The sensor assembly can be decoupled from the air dryer body, removed, and replaced with another sensor assembly. For example, if a sensor assembly fails, the sensor assembly can be removed from the sensor port and replaced with a replacement sensor assembly. The replacement sensor assembly may measure the same characteristic of the air as the prior sensor assembly, or may measure another characteristic of the air.

The sensor assembly includes a sensor substrate 226 coupled with the sensor end of the fastener body. The sensor substrate can represent a circuit board or other body. The sensor substrate includes one or more conductive bodies 228 protruding from the sensor substrate. The conductive bodies can be conductive contacts of the sensor assembly through which signals are conducted between the sensor assembly and other components (e.g., the controller). In the illustrated embodiment, the conductive bodies are elongated pins. In other embodiments, the conductive bodies can have another shape selected based on operation specific parameters. The number and/or arrangement of the conductive bodies shown in FIGS. 2 and 3 is provided as one example. A different number and/or arrangement of the conductive bodies may be used. The conductive bodies can be elongated in directions that are parallel to the elongation direction of the fastener body.

The body of the air dryer includes a substrate 260 that includes one or more conductive pathways 330 (shown in FIG. 3). The substrate 260 may be inside the sensor port and can represent a circuit board or other planar body. These conductive pathways can be conductive traces on and/or within a substrate, wires, or the like. These conductive pathways can be conductively coupled with the controller to permit communication between the sensor assembly and the controller via the conductive bodies and the conductive pathways. For example, the conductive bodies may engage or otherwise contact the conductive pathways while the sensor assembly is coupled with the body of the air dryer in the sensor port.

In the illustrated embodiment, the conductive pathways extend along concentric annular paths, as shown in FIG. 3. Alternatively, one or more of the conductive pathways may extend along arcuate paths that do or does not form a complete annulus or circle. Alternatively, two or more of the conductive pathways may extend along curved shapes (arches or circles) that are not concentric. Different conductive pathways form differently sized circles or arcuate paths in the illustrated embodiment. For example, one conductive pathway forms a larger circle than all other conductive pathways, another conductive pathway forms a smaller circle than the largest conductive pathway, but that is larger than the other conductive pathways, and so on. These conductive pathways can be referred to as slip rings. The conductive pathways and conductive bodies are positioned such that, when the sensor assembly is coupled with the body of the air dryer, the conductive bodies contact the conductive pathways. Rotating the sensor assembly (e.g., screwing the sensor assembly into or onto the threads in the sensor port) can rotate the conductive bodies relative to the conductive pathways. But, because the conductive pathways form arcuate or circular shapes, the conductive bodies can be ensured to contact the conductive pathways regardless of the rotational position of the fastener body of the sensor assembly relative to the body of the air dryer (so long as the sensor assembly is inserted far enough into the sensor port to allow the conductive bodies to contact the conductive pathways).

The sensor assembly also includes a sensor 232 that is coupled with the sensor substrate and conductively coupled with the conductive bodies (e.g., by one or more conductive bodies, such as conductive traces, in the sensor assembly). In one embodiment, the sensor is a humidity sensor that senses a humidity of air flowing within the air dryer. In the illustrated example, the fastener body of the sensor assembly includes a sensing port 234 in which the sensor is disposed. This sensing port can be a void or interior, open volume in which the sensor is disposed. At least some of the air flowing in the air dryer (e.g., the outgoing air or the incoming air) can flow between the sensor substrate and the fastener body, and can enter into the interior open volume to be examined by the sensor.

The sensor can output a signal or signals indicative of the characteristic(s) of the air being measured. The signal or signals can be conducted from the sensor to the conductive bodies, which transfer the signal or signals to the controller via the conductive pathways. Optionally, the sensor can output a signal or signals that indicate a fault of the sensor. For example, if the sensor is no longer able to measure the humidity of the outgoing air, then the sensor can output a signal indicating this fault and communicate the signal to the controller of the air dryer via the conductive bodies and the conductive pathways. This signal can indicate a need for maintenance on the sensor (e.g., repair) or replacement of the sensor.

The characteristic of the air that is sensed by the sensor can indicate the humidity of the air, the temperature of the air, air pressure, and/or the flow rate of the air. This information can be used by the controller to evaluate the operation of the air dryer, operation of the compressed air system of the vehicle, and/or operation of the vehicle system. For example, if the measured humidity of the outgoing air continues to increase over time, the controller can determine that the air dryer is in need of maintenance, inspection, or repair (e.g., due to the desiccant needing to be replaced, due to one or more of the towers not purging moist air, etc.). If the measured flow rate of the air is decreasing and/or air pressure is not increasing (while the brake system is re-charging with air), then the controller can determine that a compressor of the compressed air system is in need of inspection, repair, or other maintenance, that a valve in the brake system may be stuck in an open position or state, or the like.

Optionally, the controller of the air dryer can determine and communicate one or more characteristics of the air dryer to the vehicle control system or another component. For example, the controller can monitor how much current is being drawn by the air dryer (e.g., for powering the heater, for powering the sensor, for powering the valve or solenoid, etc.), a status of a memory in the air dryer that stores previously measured characteristics, an error or fault of the sensor, an error or fault of a solenoid or valve of the air dryer (e.g., that switches between which tower is purged and which receives air for drying), or an error or fault of the heater of the air dryer. In one embodiment, a pressure sensor may monitor the air flow rate through the system and communicate with the controller. The controller may determine that the flow rate has changed, for example dropped. The controller may determine, for example, that the desiccant is saturated, the media and/or ducting is blocked, or the fan or louvres are faulty.

Figure 4:
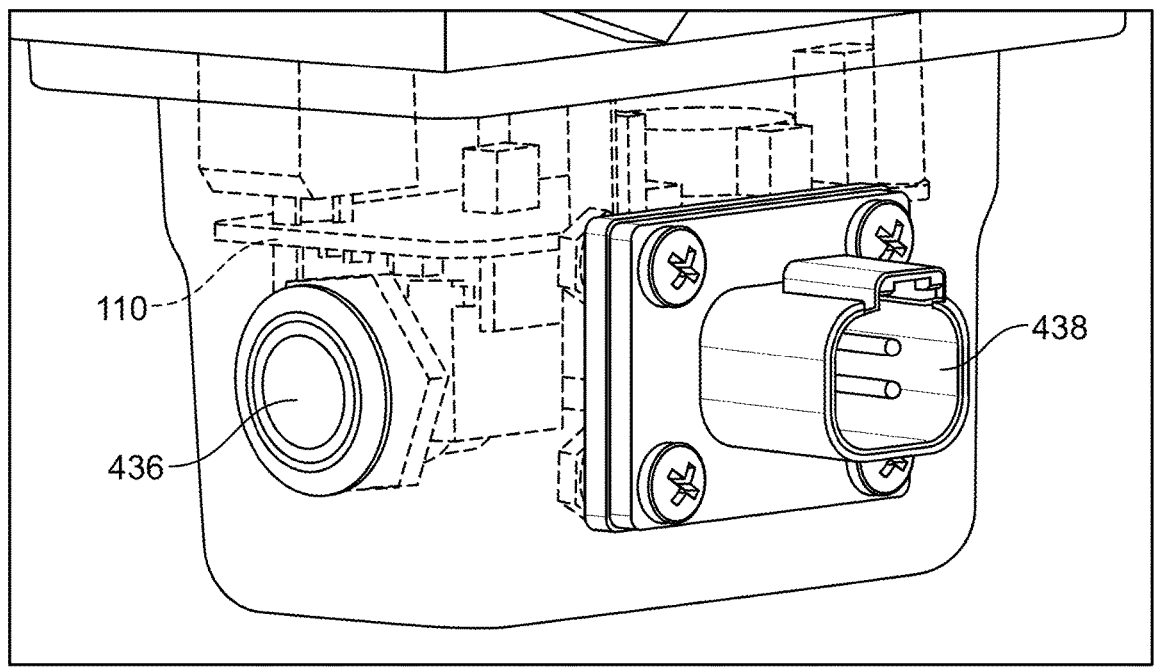
FIG. 4 illustrates one example of interior details of the air dryer shown in FIG. 1.

FIG. 4 illustrates one example of interior details of the body of the air dryer shown in FIG. 1. The body of the air dryer can include the controller described above, and also may include an input and/or output device 436 (I/O device). This I/O device can be a push button that also includes one or more light-generating devices (e.g., light emitting diodes). The light-generating devices can generate light within and/or around the touch surface of the button to indicate a status or state of the air dryer and/or can optionally flash the light on and off (or switch between colors). For example, the light-generating device can flash different sequences to indicate what type of service is required. Alternatively, the light-generating devices can generate light of a first color (e.g., green) to indicate that the air dryer is operating without any known or detected faults, generate light of a second color (e.g., red) to indicate a fault (e.g., the humidity of the outgoing air is greater than an upper humidity threshold), flash light of a third color (e.g., white) to indicate that service of the air dryer is needed. The controller can control which light is generated based on output from the sensor and/or one or more other error checks performed by the controller.

The air dryer also includes a communication pathway 438 that allows the air dryer (and the controller and/or sensor of the air dryer) to communicate with one or more external devices. In the illustrated embodiment, the communication pathway is a cable or connector that may mate with a corresponding connector to form conductive pathways between the air dryer and the external device(s). Alternatively, the communication pathway can be replaced or augmented with a wireless communication device, such as transceiving circuitry (e.g., modems, antennas, or the like) that wirelessly communicates with the external device(s). The controller and/or sensor can communicate the sensed characteristic of the air to a vehicle control system that controls operation (e.g., movement) of the vehicle system using the sensed characteristic.

With respect to the communication pathway including or being connected with a connector, the connector can communicate the output of the sensor and/or can convey communication with the controller via a wired network onboard the vehicle system. This wired network can be a controller area network (CAN) bus that extends throughout the vehicle system (or at least to a control system of the vehicle system). Alternatively, the wired network can be an Ethernet network, a time-sensitive network, or the like.

The communication pathway optionally can receive one or more updates or changes to firmware or software of the air dryer. These updates or changes can be received from a device that is off-board the vehicle system and/or from a vehicle system controller. These updates or changes can be received via a wired connection (e.g., the communication pathway) or via a wireless connection.

Figure 5:
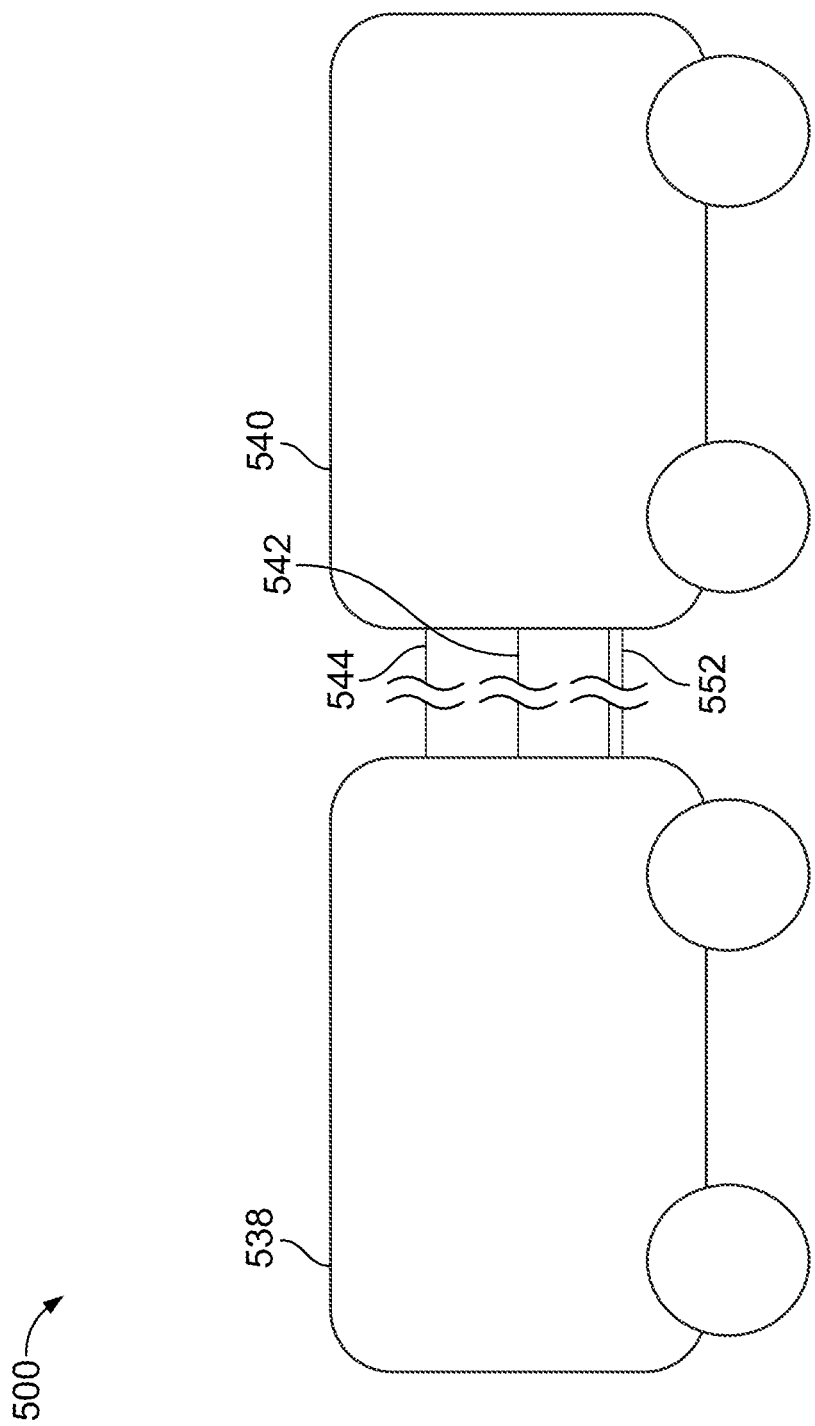
FIG. 5 illustrates one example of a multi-vehicle system that includes at least first and second vehicles.
Figure 6:
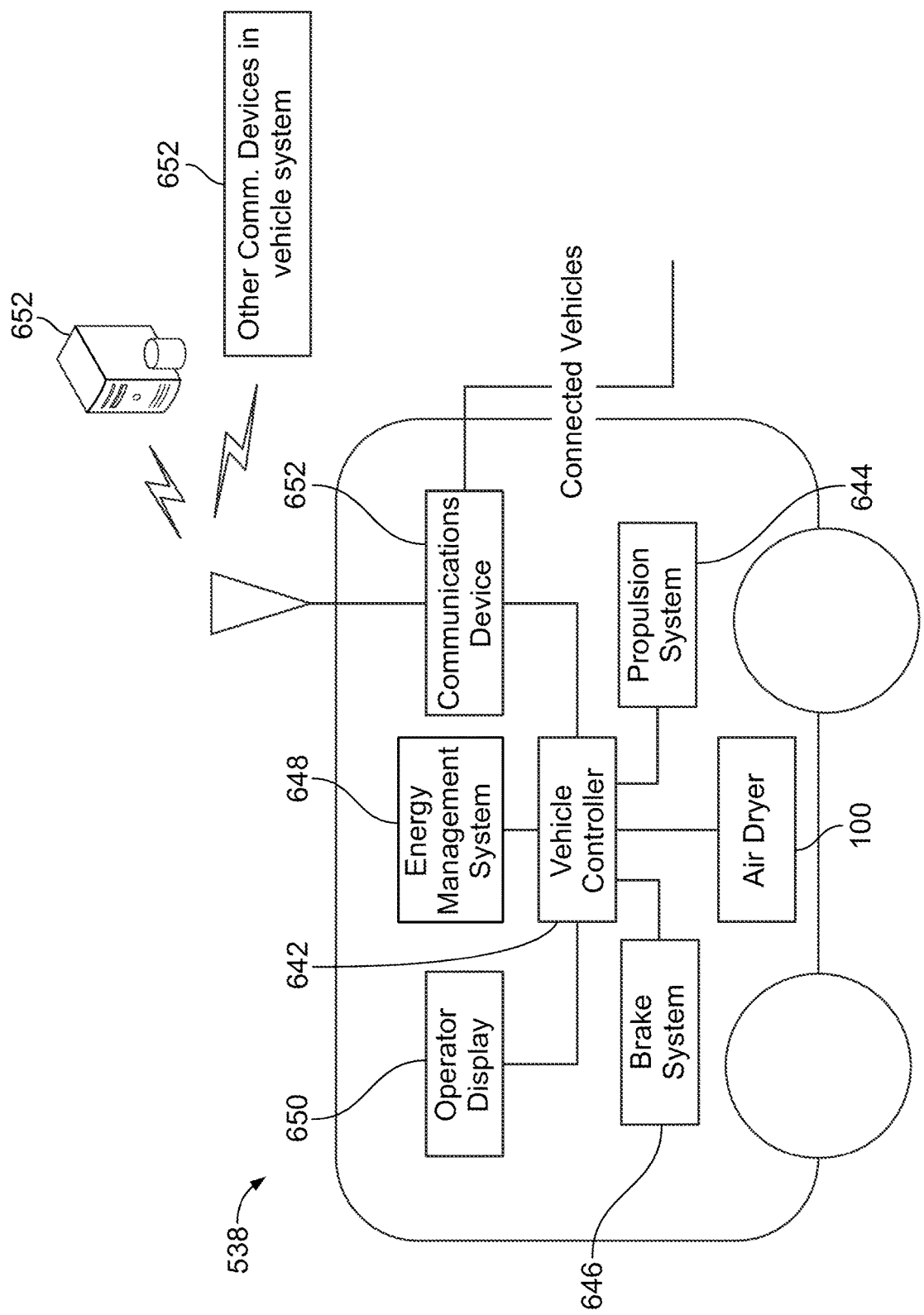
FIG. 6 illustrates one example of a first vehicle shown in FIG. 5.
Figure 7:
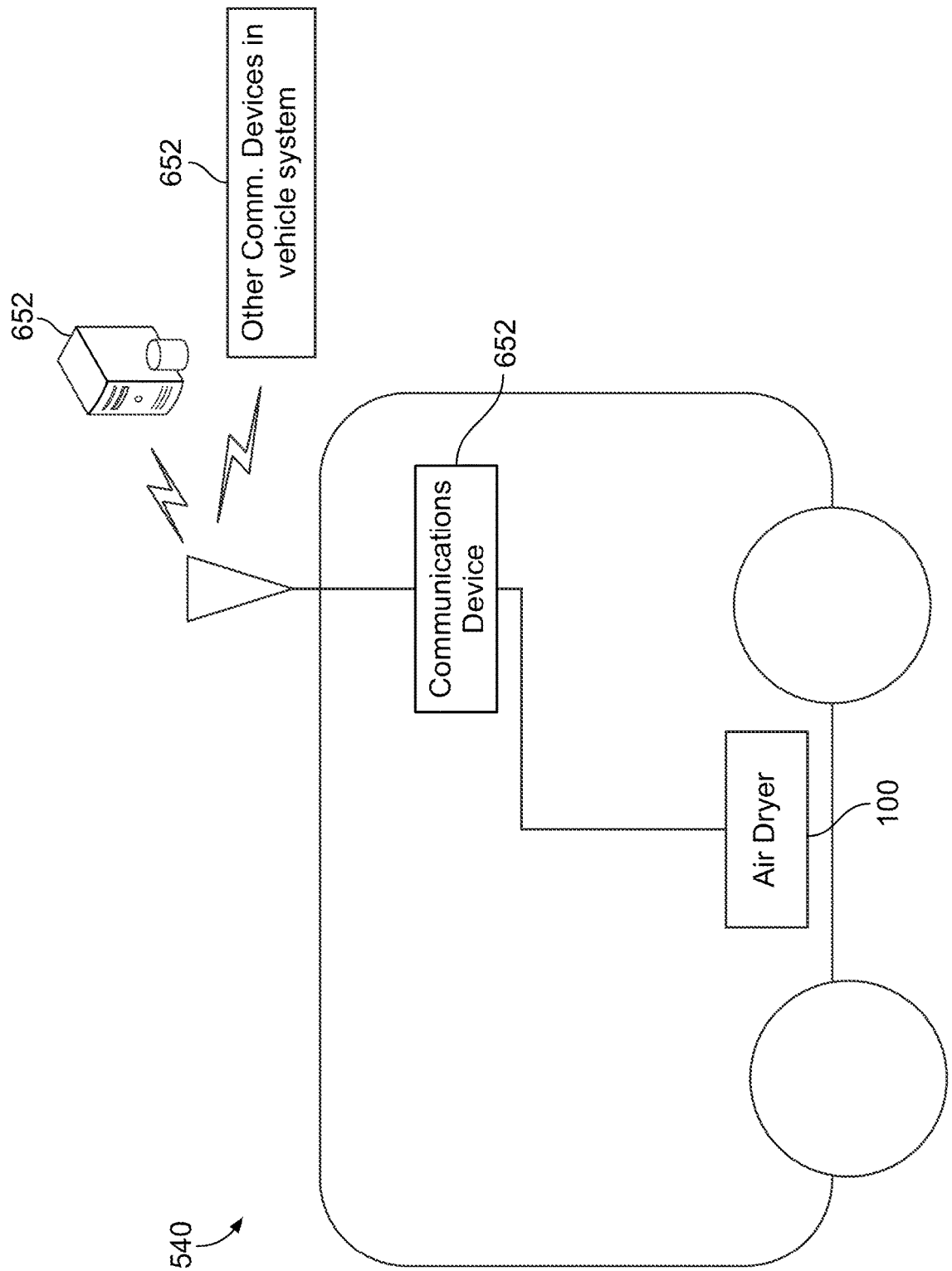
FIG. 7 illustrates one example of a second vehicle shown in FIG. 5.

FIG. 5 illustrates one example of a multi-vehicle system 500 that includes at least first and second vehicles 538, 540. FIG. 6 illustrates one example of the first vehicle 538 and FIG. 7 illustrates one example of the second vehicle 540. The vehicle system can be formed of the vehicles 538, 540 that are mechanically coupled with each other (e.g., by couplers 542) and/or communicatively coupled with each other by a communication network 544. While only two vehicles are shown in FIG. 5, the multi-vehicle system may be formed from more than two vehicles. Alternatively, the vehicle system may be a single vehicle system formed from a single vehicle. In another embodiment, the vehicles may not be mechanically coupled with each other, but may be logically, virtually, or communicatively coupled with each other. For example, the vehicles in the vehicle system may include propulsion-generating vehicles that communicate with each other to coordinate movements of the vehicles with each other so that the vehicles move together along routes (e.g., as a convoy) without the vehicles all being mechanically coupled with each other. At least one of the vehicles can represent a propulsion-generating vehicle, such as a locomotive, truck, automobile, mining vehicle, agricultural vehicle, or the like. Optionally, at least one of the vehicles can represent a non-propulsion-generating vehicle, such as a rail car, trailer, or the like. In one embodiment, the vehicle 538 is a propulsion-generating vehicle while the vehicle 540 is a non-propulsion-generating vehicle.

The communication network can represent wired and/or wireless connections between and/or among the vehicles. The network can be used by the controller of the air dryer to communicate with a vehicle control system and/or other components.

The vehicle control system may include a vehicle controller 642 (shown in FIG. 6) that represents hardware circuitry that includes and/or is coupled with one or more processors. The vehicle controller controls operation of the vehicle system. For example, the vehicle controller can communicate with a propulsion system 644 onboard the vehicle system to control the tractive effort, propulsion, etc., generated by the vehicle system. The propulsion system can represent one or more engines, motors, or the like, that generate tractive effort to move the vehicle system. The vehicle controller also can control operation of a vehicle braking system 646. The vehicle braking system can represent an air brake system that receives air that is dried by the air dryers described herein. A brake pipe 552 or other conduit (shown in FIG. 5) of the braking system can extend between the vehicles and carry air for the components of the braking system that are disposed onboard the vehicles. The brake pipe may be fluidly coupled with the inlet and outlet of the air dryer to direct at least some of the air in the braking system into and through the air dryer for drying the air.

The vehicle controller can control the propulsion system and/or braking system based on operator input and/or can automatically control the propulsion system and/or braking system. An energy management system 648 represents hardware circuitry that includes and/or is coupled with one or more processors that determine settings for the propulsion system and/or braking system for automatic control (or directed manual control) of the vehicle system. For example, the energy management system can determine operational settings (e.g., throttle settings, brake settings, speeds, etc.) for different locations, times, and/or distances along one or more routes. These operational settings can be automatically implemented by the vehicle controller or the vehicle controller can inform an operator of these settings for the operator to manually input. For example, the vehicle controller can direct an electronic operator display 650 to present text, images, etc., to instruct the operator to control the vehicle system.

The vehicle control system also includes communication devices 652 onboard the vehicles. The communication devices communicate with one or more other communication devices onboard and/or off-board the vehicle system. The communication device can represent transceiving circuitry, such as one or more antennas, modems, transceivers, receivers, etc. that communicate with other devices via the communication network. The communication devices can communicate with the air dryers onboard the vehicle system to receive the characteristics that are measured by the sensor(s) of the air dryer(s) and convey the characteristics to the vehicle controller. The communication devices can communicate with other communication devices disposed off-board the vehicle system. For example, the characteristics sensed by the sensors in the air dryers and/or other outputs of the air dryers can be communicated to an off-board location via the communication devices. This can include a repair or inspection facility that can receive the characteristics and/or other outputs from the air dryers and use this information to determine when and/or how to repair the air dryers when the vehicle system arrives at the facility. Optionally, this information can be tracked by the facility over time to determine trends or other changes over time in performance and operation of the air dryers.

In one embodiment, communications with the air dryer may be encrypted. For example, the air dryer controller can send information to the vehicle controller using encrypted messages. This can prevent a bad actor from mimicking the air dryer controller with another device that attempts to send signals to the vehicle controller that appear to be from the air dryer. Without the required encryption key, the bad actor may be unable to use a device to mimic the signals sent by the air dryer.

The vehicle controller can receive the characteristic that is measured by the sensor of the air dryer and/or determined by the air dryer controller. The vehicle controller can control one or more operations of the vehicle system based on the characteristic that is received. For example, responsive to determining that the humidity of the outgoing air from the air dryer is exceeding a threshold or is increasing over time, the vehicle controller can notify the operator (e.g., via the I/O device on the air dryer, via the operator display, etc.) and/or direct the air dryer controller to change operation. The vehicle controller can direct the air dyer controller to change the time periods over which the towers purge or dry air to reduce the amount of time that air is dried within at least one of the towers (and/or increase the time that moist air is purged from at least one of the towers). As another example, responsive to determining that the current demanded by the air dryer is exceeding a threshold or is increasing over time, the vehicle controller can notify the operator and/or direct the air dryer controller to change operation (e.g., by shutting down or restarting the air dryer). As another example, responsive to determining that the sensor has failed or is in a fault state, the vehicle controller can notify the operator and/or direct the air dryer controller to change operation (e.g., by shutting down or restarting the air dryer). Optionally, the vehicle controller can activate another air dryer onboard the vehicle system.

As another example, responsive to determining that a solenoid or valve in the air dryer has failed or is in a fault state, the vehicle controller can notify the operator and/or direct the air dryer controller to change operation (e.g., by shutting down or restarting the air dryer). Optionally, the vehicle controller can activate another air dryer onboard the vehicle system. As another example, responsive to determining that the heater in the air dryer has failed or is in a fault state, the vehicle controller can notify the operator and/or direct the air dryer controller to change operation (e.g., by shutting down or restarting the air dryer). Optionally, the vehicle controller can activate another air dryer onboard the vehicle system.

The vehicle controller can monitor the characteristics sensed by the air dryer and determine that there is an error or fault in an air compressor of the braking system. The air compressor can be included in the braking system and can increase the air pressure in the braking system. The sensor(s) in one or more air dryers onboard the vehicle system may detect a decrease in air pressure in the compressed air system and/or a decrease in the rate of flow of air into the air dryer. This can indicate that the air compressor is not generating enough air pressure for the compressed air system. The vehicle controller can notify the operator and/or slow or stop movement of the vehicle system (e.g., by controlling the propulsion system and/or braking system) so the air compressor can be examined and/or repaired.

Optionally, the vehicle controller can control operation of the air dryer based on the characteristic(s) received from the air dryer(s) and/or one or more other characteristics. These other characteristics can include an ambient humidity, an elevation of the vehicle system, an ambient temperature, a moving speed of the vehicle system, or the like. For example, the vehicle controller may direct the air dryer controller to change a humidity threshold based on the ambient humidity, the elevation, the ambient temperature, the moving speed, etc. As described above, the air dryer controller can change the purge times for the towers of the air dryer based on the measured humidity exceeding the humidity threshold. This threshold can be changed by the vehicle controller based on one or more of the factors listed above. For example, when the ambient humidity is increased (e.g., above an ambient humidity threshold), the vehicle controller can direct the air dryer controller to increase the humidity threshold of the air dyer. When the ambient humidity is decreased (e.g., to no greater than the ambient humidity threshold or to lower than another threshold), the vehicle controller can direct the air dryer controller to decrease the humidity threshold of the air dyer.

As another example, when the elevation is higher (e.g., above an elevation threshold), the vehicle controller can direct the air dryer controller to decrease the humidity threshold of the air dyer. When the elevation is decreased (e.g., to no greater than the elevation threshold or to lower than another threshold), the vehicle controller can direct the air dryer controller to decrease the humidity threshold of the air dyer.

In another example, when the ambient temperature is higher (e.g., warmer than a threshold temperature), the vehicle controller can direct the air dryer controller to increase the humidity threshold of the air dyer. When the ambient temperature is decreased (e.g., to no warmer than the threshold temperature or to cooler than another threshold), the vehicle controller can direct the air dryer controller to decrease the humidity threshold of the air dyer.

In another example, when the moving speed of the vehicle system is faster (e.g., faster than a threshold speed), the vehicle controller can direct the air dryer controller to decrease the humidity threshold of the air dyer. This can help ensure that there is sufficient air pressure in the compressed air system (and not in the air dryers or purged from the air dryers) to brake the vehicle system if needed. When the speed is decreased (e.g., to no faster than the threshold speed or to slower than another threshold), the vehicle controller can direct the air dryer controller to increase the humidity threshold of the air dyer.

The vehicle controller also can change operation of one or more other components of the vehicle system based on the sensor data from the air dryer. For example, the vehicle system may have multiple air dryers in different locations along the compressed air system. Responsive to an error or fault in one air dryer, the vehicle controller can direct the air dryer controller of one or more other air dryers to activate the air dryers (if the air dryers were inactive or turned off) and/or to decrease the purge times of the air dryers. As another example, responsive to detecting a decrease in air pressure in the compressed air system that is not the result of a brake application, the vehicle controller can direct the air dryer controller of one or more air dryers to decrease the purge times of the towers to reduce the air pressure that is directed out of the air braking system. Or, the vehicle controller can automatically slow or stop movement of the vehicle system responsive to detecting a decrease in air pressure in the braking system that is not the result of a brake application.

Figure 8:
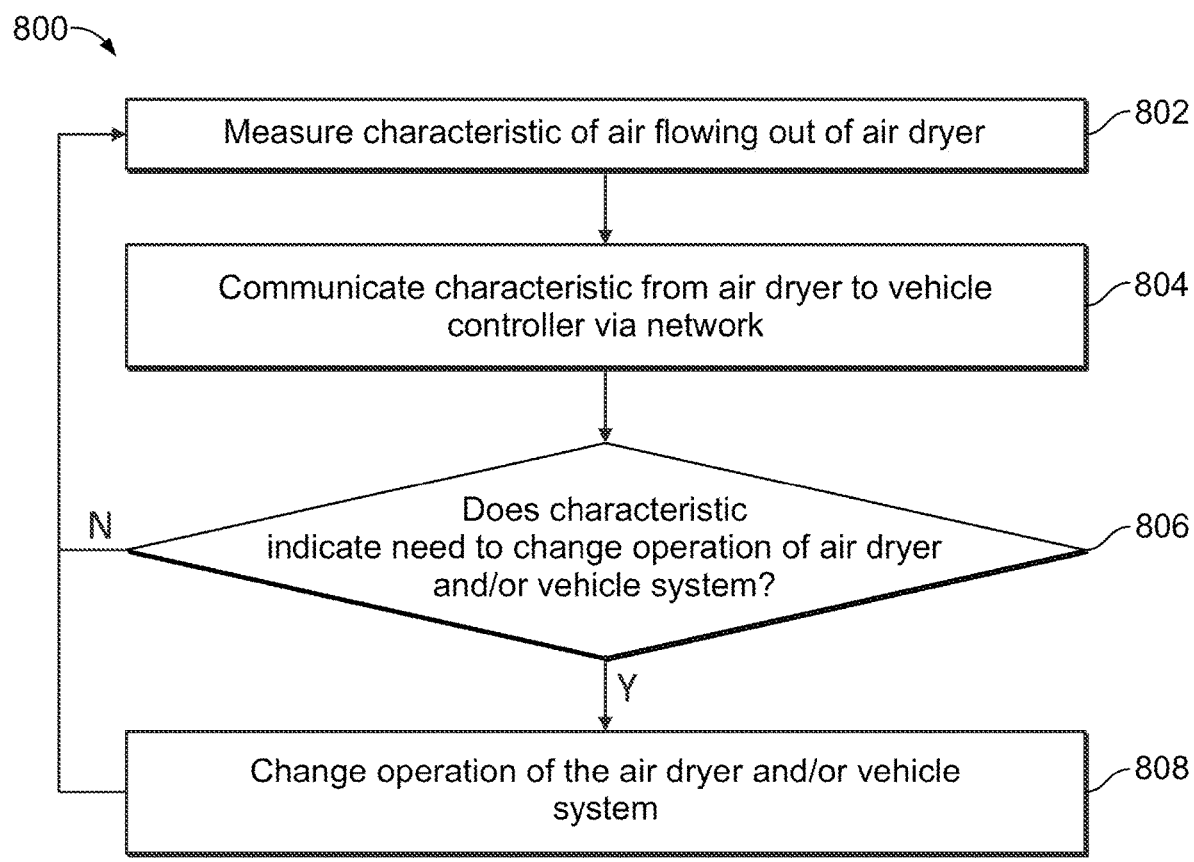
FIG. 8 illustrates a flowchart of one example of a method for controlling operation of a vehicle system based on data output by a sensor of an air dryer.

FIG. 8 illustrates a flowchart of one example of a method 800 for controlling operation of a vehicle system based on data output by a sensor of an air dryer. The method can represent operations performed by the controller described herein. At step 802, a characteristic of air flowing out of an air dryer is determined. As described above, this characteristic can be a humidity of outgoing air from the air dryer, but optionally can be a temperature, pressure, flow rate, or the like, of the air.

At step 804, the characteristic that is determined is communicated from the air dryer to the vehicle controller. This characteristic can be communicated via a wired network onboard the vehicle system. Optionally, the characteristic can be wirelessly communicated. At step 806, a determination is made as to whether the characteristic indicates a need to change operation of the air dryer and/or vehicle system. The characteristic may indicate an error or fault of the air dryer, a need to replace a desiccant in a tower (or to replace the tower), a need to slow or stop movement of the vehicle system, etc. If the characteristic indicates a need to change operation of the air dryer or vehicle system, flow of the method can proceed toward step 808. Otherwise, flow of the method can return toward step 802 or may terminate. At step 808, operation of the air dryer, one or more other air dryers, and/or the vehicle system may be changed due to the characteristic that was determined. As described above, this change in operation can involve activating another air dryer, generating an alarm or warning to an operator, slowing down or stopping movement of the vehicle system, changing a threshold of the air dryer, or the like. Flow of the method can return toward step 802 or may terminate.

In one embodiment, a sensor assembly includes a fastener body extending from a fastener end to an opposite sensor end along an elongation direction, the sensor end shaped to be inserted into a sensor port of an air dryer, and a sensor substrate coupled with the sensor end of the fastener body. The sensor substrate includes one or more conductive bodies protruding from the sensor substrate and one or more first conductive pathways coupled with the one or more conductive bodies. The sensor assembly also includes a sensor coupled with the sensor substrate and conductively coupled with the one or more conductive bodies by the one or more first conductive pathways. The sensor may sense a humidity of air flowing through the air dryer. The one or more conductive bodies of the sensor substrate are positioned to engage one or more arcuate or annular conductive pathways in the air dryer in different rotational positions of the fastener body relative to the air dryer.

The fastener end can have a shape or recess that may be engaged by a tool for screwing the fastener body into the sensor port of the air dryer. The one or more conductive bodies protruding from the sensor substrate can include one or more conductive pins protruding from the sensor substrate. The one or more conductive bodies can protrude from the sensor substrate in one or more first directions that are parallel to the elongation direction of the fastener body. The one or more first conductive pathways can include one or more conductive traces. The one or more conductive bodies of the sensor substrate can be positioned to engage one or more slip rings as the one or more arcuate or annular conductive pathways in the air dryer. The sensor can communicate an electric signal to the air dryer via the one or more first conductive pathways. The one or more conductive bodies can protrude from the sensor substrate and the one or more arcuate or annular conductive pathways in the air dryer. The sensor can communicate the electric signal to the air dryer to indicate a fault of the sensor. The sensor can communicate the electric signal to the air dryer to indicate the humidity that is sensed of the air flowing through the air dryer. The sensor can communicate the electric signal to the air dryer to indicate a maintenance need of the sensor.

In one embodiment, a dryer includes a container that may receive air from a compressed air system of a vehicle system and to reduce a humidity of the air, one or more sensors may sense a characteristic of one or more of the air from the compressed air system, operation of the air dryer, or operation of the vehicle system, and a communication device communicatively coupled with the one or more sensors. The communication device may communicate the characteristic to a vehicle control system.

The communication device may communicate the characteristic to the vehicle control system via a wired network onboard the vehicle system. The communication device may wirelessly communicate the characteristic to the vehicle control system. The communication device may communicate the characteristic from a first vehicle in the vehicle system to the vehicle control system disposed onboard a second vehicle in the vehicle system. The one or more sensors may sense the characteristic of the air as one or more of a pressure of the air, a humidity of the air, a pressure drop of the air, a flow rate of the air, or a temperature of the air. The one or more sensors may sense the characteristic of operation of the air dryer as one or more of a voltage of the air dryer, current draw of the air dryer, a memory status of a memory in the air dryer, an error or fault of the one or more sensors, an error or fault of a solenoid or valve of the air dryer, or an error or fault of a heater of the air dryer. The one or more sensors may sense the characteristic of operation of the vehicle system as an error or fault of an air compressor of the vehicle system. The communication device may communicate the characteristic to the vehicle control system via an encrypted message.

In one embodiment, a vehicle control system includes one or more processors that may receive a characteristic of one or more of air from a vehicle compressed air system that flows through an air dryer that reduces a humidity of the air, operation of the air dryer, or operation of a vehicle system. The one or more processors may receive the characteristic from the air dryer and to control operation of one or more of the air dryer or the vehicle system based at least in part on the characteristic that is received from the air dryer.

The characteristic can represent one or more of an overvoltage condition of the air dryer, an undervoltage condition of the air dryer, an overcurrent of the air dryer, a pressure of the air flowing through the air dryer, a memory error of the air dryer, the humidity of the air flowing through the air dryer, a fault of the air dryer, a fault of a heater of the air dryer, or a fault of an air compressor of the vehicle system. The one or more processors may control operation of the air dryer based on the characteristic received from the air dryer and one or more of an ambient humidity, an elevation of the vehicle system, an ambient temperature, or a moving speed of the vehicle system.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A sensor assembly, comprising:
   a fastener body extending from a fastener end to an opposite sensor end along an elongation direction, the sensor end shaped to be inserted into a sensor port of an air dryer;
   a sensor substrate coupled with the sensor end of the fastener body, the sensor substrate including one or more conductive bodies protruding from the sensor substrate and one or more first conductive pathways coupled with the one or more conductive bodies; and
   a sensor coupled with the sensor substrate and conductively coupled with the one or more conductive bodies by the one or more first conductive pathways, the sensor configured to sense a humidity of air flowing through the air dryer, the one or more conductive bodies of the sensor substrate positioned to engage one or more arcuate or annular conductive pathways in the air dryer in different rotational positions of the fastener body relative to the air dryer.

2. The sensor assembly of claim 1, wherein the fastener end has a shape or recess configured to be engaged by a tool for screwing the fastener body into the sensor port of the air dryer.

3. The sensor assembly of claim 1, wherein the one or more conductive bodies protruding from the sensor substrate include one or more conductive pins protruding from the sensor substrate.

4. The sensor assembly of claim 1, wherein the one or more conductive bodies protrude from the sensor substrate in one or more first directions that are parallel to the elongation direction of the fastener body.

5. The sensor assembly of claim 1, wherein the one or more first conductive pathways comprise one or more conductive traces.

6. The sensor assembly of claim 1, wherein the one or more conductive bodies of the sensor substrate are positioned to engage one or more slip rings as the one or more arcuate or annular conductive pathways in the air dryer.

7. The sensor assembly of claim 1, wherein the sensor is configured to communicate an electric signal to the air dryer via the one or more first conductive pathways, the one or more conductive bodies protruding from the sensor substrate, and the one or more arcuate or annular conductive pathways in the air dryer.

8. The sensor assembly of claim 7, wherein the sensor is configured to communicate the electric signal to the air dryer to indicate a fault of the sensor.

9. The sensor assembly of claim 7, wherein the sensor is configured to communicate the electric signal to the air dryer to indicate the humidity that is sensed of the air flowing through the air dryer.

10. The sensor assembly of claim 7, wherein the sensor is configured to communicate the electric signal to the air dryer to indicate a maintenance need of the sensor.

11. An air dryer, comprising:
   a container configured to receive air from a compressed air system of a vehicle system and to reduce a humidity of the air;
   one or more sensors configured to sense a characteristic of one or more of the air from the compressed air system, operation of the air dryer, or operation of the vehicle system; and
   a communication device communicatively coupled with the one or more sensors, the communication device configured to communicate the characteristic to a vehicle control system,
   wherein the characteristic of the air from the compressed air system comprises one or more of a pressure of the air, a humidity of the air, a pressure drop of the air, a flow rate of the air, or a temperature of the air.

12. The air dryer of claim 11, wherein the communication device is configured to communicate the characteristic to the vehicle control system via a wired network onboard the vehicle system.

13. The air dryer of claim 11, wherein the communication device is configured to wirelessly communicate the characteristic to the vehicle control system.

14. The air dryer of claim 11, wherein the communication device is configured to communicate the characteristic from a first vehicle in the vehicle system to the vehicle control system disposed onboard a second vehicle in the vehicle system.

15. The air dryer of claim 11, wherein the one or more sensors are configured to sense the characteristic of operation of the air dryer as one or more of a voltage of the air dryer, current draw of the air dryer, a memory status of a memory in the air dryer, an error or fault of the one or more sensors, an error or fault of a solenoid or valve of the air dryer, or an error or fault of a heater of the air dryer.

16. The air dryer of claim 11, wherein the one or more sensors are configured to sense the characteristic of operation of the vehicle system as an error or fault of an air compressor of the vehicle system.

17. The air dryer of claim 11, wherein the communication device is configured to communicate the characteristic to the vehicle control system via an encrypted message.

18. The air dryer of claim 11, wherein one or more sensors are configured to sense a characteristic of the air from the compressed air system.

\* \* \* \* \*